(12) United States Patent
Sha et al.

(10) Patent No.: US 12,539,780 B2
(45) Date of Patent: Feb. 3, 2026

(54) LID LOCK FOR REFUELING OR CHARGING PORT

(71) Applicant: Illinois Tool Works Inc., Glenview, IL (US)

(72) Inventors: Wenquan Sha, Shanghai (CN); Yuan Sun, Shanghai (CN)

(73) Assignee: Illinois Tool Works Inc., Glenview, IL (US)

( * ) Notice: Subject to any disclaimer, the term of this patent is extended or adjusted under 35 U.S.C. 154(b) by 92 days.

(21) Appl. No.: 18/389,296

(22) Filed: Nov. 14, 2023

(65) Prior Publication Data

US 2024/0159095 A1 May 16, 2024

(30) Foreign Application Priority Data

Nov. 16, 2022 (CN) .......................... 202223049674.X

(51) Int. Cl.
*B60L 53/16* (2019.01)
*B60K 15/05* (2006.01)

(52) U.S. Cl.
CPC .............. *B60L 53/16* (2019.02); *B60K 15/05* (2013.01); *B60K 2015/0561* (2013.01);
(Continued)

(58) Field of Classification Search
CPC . B60L 53/16; B60K 15/05; B60K 2015/0515; B60K 2015/0538;
(Continued)

(56) References Cited

U.S. PATENT DOCUMENTS 5,222,774 A * 6/1993 Fukumoto ............... E05B 81/14
292/144
5,236,233 A * 8/1993 Fukumoto ........... E05B 63/0069
292/171
(Continued)

FOREIGN PATENT DOCUMENTS

CN 112377021 A 2/2021

*Primary Examiner* — Nathan Cumar
(74) *Attorney, Agent, or Firm* — McAndrews, Held & Malloy, Ltd.

(57) ABSTRACT

The present disclosure provides a lid lock for a refueling or charging port having: a lifting shaft; a worm wheel; and a worm shaft. The worm wheel and the worm shaft are configured such that the worm shaft rotates in a first direction to drive the worm wheel to rotate, thereby driving the lifting shaft to perform a descending movement in an axial direction of the lifting shaft and then perform a rotational movement to expose a refueling or charging port for supplying fuel or electricity. In some examples, the worm shaft rotates in a second direction to drive the worm wheel to rotate, thereby driving the lifting shaft to perform a rotational movement and then perform an ascending movement in the axial direction of the lifting shaft to close the refueling or charging port. The present disclosure provides an internally retractable lid lock for a refueling or charging port. An internal space between an outer sheet metal of a vehicle and a refueling and charging port is fully utilized, so that a lid can be opened in the internal space, which not only is not limited by an external environment, but also reduces the possibility of damaging parts.

17 Claims, 10 Drawing Sheets

(52) U.S. Cl.
CPC ............... *B60K 2015/0576* (2013.01); *B60K 2015/0584* (2013.01); *E05Y 2201/10* (2013.01); *E05Y 2201/22* (2013.01); *E05Y 2201/706* (2013.01); *E05Y 2201/71* (2013.01); *E05Y 2900/534* (2013.01)

(58) Field of Classification Search
CPC .... B60K 2015/0561; B60K 2015/0576; B60K 2015/0584; E05Y 2201/10; E05Y 2201/706; E05Y 2201/71; E05Y 2900/534; E05B 83/34; E05B 83/84; E05F 15/603
USPC ........................................................ 292/144
See application file for complete search history.

(56) References Cited

U.S. PATENT DOCUMENTS

| | | | |
|---|---|---|---|
| 10,759,290 B2* | 9/2020 | Sha ................. | E05F 15/603 |
| 2003/0071470 A1* | 4/2003 | Yeh ................. | E05B 47/0012 |
| | | | 292/144 |
| 2015/0008685 A1* | 1/2015 | Beck ................ | E05B 83/34 |
| | | | 292/336.3 |
| 2016/0375762 A1* | 12/2016 | Lee ................. | B60K 15/05 |
| | | | 296/97.22 |
| 2019/0047428 A1* | 2/2019 | Sha ................. | E05F 15/603 |

* cited by examiner

A-A

B-B

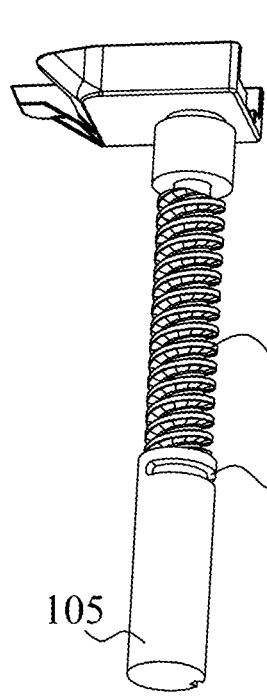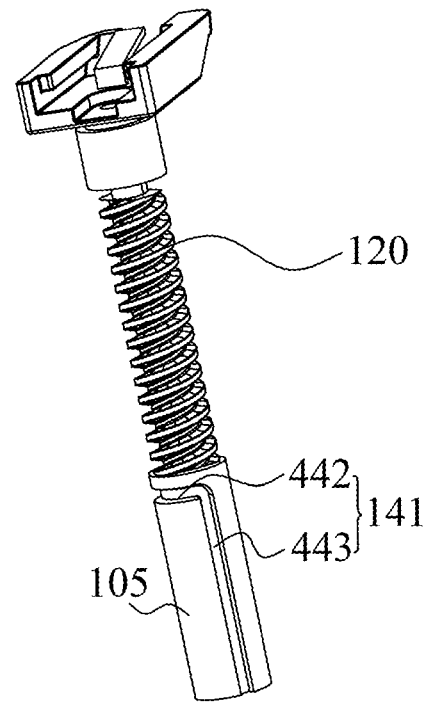
Fig. 4A
Fig. 4B
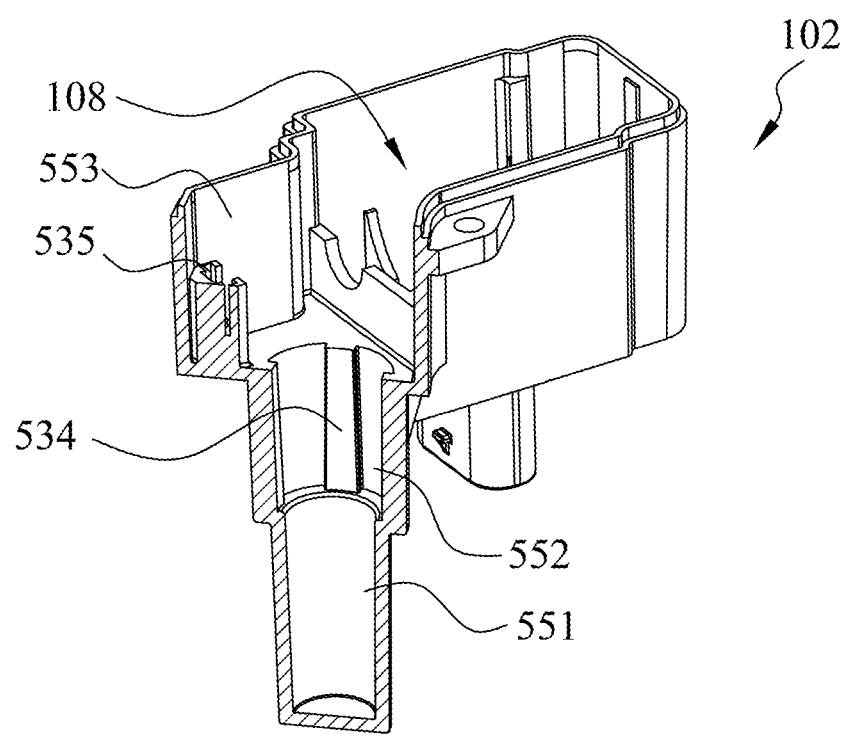
Fig. 5

LID LOCK FOR REFUELING OR CHARGING PORT

RELATED APPLICATION

The present application claims the benefit of Chinese Patent Application No. 202223049674X, filed Nov. 16, 2022, titled "Lid Lock for Refueling or Charging Port," the contents of which are hereby incorporated by reference.

TECHNICAL FIELD

The present disclosure relates to a lid lock, and in particular, to a lid lock for a refueling or charging port.

BACKGROUND

A vehicle with a fuel-driven engine is provided with a refueling port for fuel or oil supply, and an electric vehicle is also correspondingly provided with a charging port for electricity supply. The current refueling or charging port is shielded by a lid, and the lid is locked to the refueling or charging port by a lid lock. By controlling a movement of the lid lock, the lid can be opened, when a refueling or charging is needed, to expose the refueling or charging port, and then fuel or electricity can be replenished to the vehicle by means of the refueling or charging port, or after the refueling or charging is completed, the lid is closed to close the refueling or charging port.

SUMMARY

The present disclosure relates generally to a lid lock for a refueling or charging port, substantially as illustrated by and described in connection with at least one of the figures, as set forth more completely in the claims.

DRAWINGS

The foregoing and other objects, features, and advantages of the devices, systems, and methods described herein will be apparent from the following description of particular examples thereof, as illustrated in the accompanying figures; where like or similar reference numbers refer to like or similar structures. The figures are not necessarily to scale, emphasis instead being placed upon illustrating the principles of the devices, systems, and methods described herein.

FIG. 4A is a perspective structural diagram of a lifting shaft and a trajectory sleeve in FIG. 1C at an angle.

FIG. 4B is a perspective structural diagram of a lifting shaft and a trajectory sleeve in FIG. 1C at another angle.

FIG. 5 is a perspective longitudinal cross-sectional view of a lower housing in FIG. 1C.

FIG. 8A is a front view of the lid lock of a refueling or charging port when the lid lock is in an opened state.

FIG. 8B is a cross-sectional view of the lid lock of a refueling or charging port shown in FIG. 8A, taken along line E-E.

DESCRIPTION

Figure 1A:
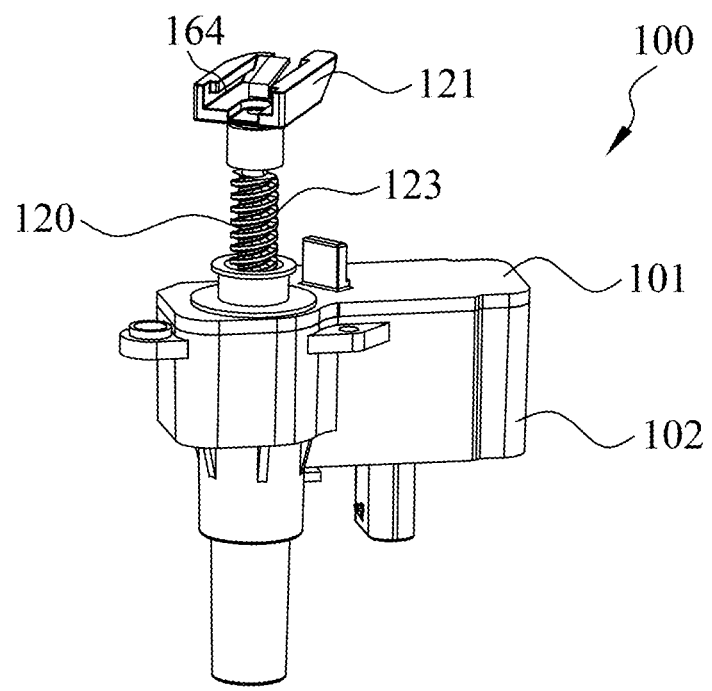
FIG. 1A is a perspective structural diagram of a lid lock for a refueling or charging port in a closed state according to the present disclosure.

Various specific implementations of the present disclosure will be described below with reference to the accompanying drawings which form a part of this description. It should be understood that although the terms indicating directions, such as "front", "rear", "upper", "lower", "left", "right", "top", "bottom", "inner", and "outer", are used in the present disclosure to describe structural parts and elements in various examples of the present disclosure, these terms are used herein only for ease of illustration and are determined based on the exemplary orientations shown in the accompanying drawings. Since the embodiments disclosed in the present disclosure can be arranged in different directions, these terms indicating directions are merely illustrative and should not be considered as limitations.

In order to solve the above-mentioned problems, at least one objective of the present disclosure is to provide a lid lock for a refueling or charging port, comprising: a lifting shaft having a head for mounting a refueling or charging port lid, the lifting shaft being provided with lifting screw teeth on an outer wall thereof; a worm wheel provided with inner screw teeth and an outer gear, the worm wheel being rotatably sleeved on the outside of the lifting shaft, and the inner screw teeth of the worm wheel being meshed with the lifting screw teeth of the lifting shaft; and a worm shaft provided with helical teeth on the outside thereof, the helical teeth being meshed with the outer gear of the worm wheel, and the worm shaft being rotatable in a first direction and a second direction opposite to the first direction, wherein the worm wheel and the worm shaft are configured such that the worm shaft rotates in the first direction to drive the worm wheel to rotate, thereby driving the lifting shaft to perform a descending movement in an axial direction of the lifting shaft and then perform a rotational movement to expose a refueling or charging port for fuel or electricity supply; or the worm shaft rotates in the second direction to drive the worm wheel to rotate, thereby driving the lifting shaft to perform a rotational movement and then perform an ascending movement in the axial direction of the lifting shaft to close the refueling or charging port.

In some examples, the lid lock for a refueling or charging port further comprises: a housing having a cavity, wherein a portion of the lifting shaft is accommodated in the cavity, the head of the lifting shaft protrudes from the cavity, and the worm wheel and the worm shaft are accommodated in the cavity; wherein the housing is fixedly secured so that when the lifting shaft moves, the lifting shaft moves relative to the housing.

In some examples, the lid lock for a refueling or charging port further comprises: a limiting sleeve arranged within the cavity of the housing and connected to the housing, wherein the housing and the limiting sleeve are configured to limit the movement of the worm wheel in the axial direction.

In some examples, a top portion of an inner wall of the limiting sleeve and a bottom portion of the worm wheel have stepped portions complementary in shape, such that the limiting sleeve is capable of supporting the worm wheel and limiting a downward movement of the worm wheel; and the housing comprises an upper housing, wherein a top portion of the worm wheel is positioned below the upper housing, such that the upper housing is capable of limiting an upward movement of the worm wheel.

In some examples, the housing further comprises a lower housing, wherein the limiting sleeve is arranged within the cavity of the lower housing, and an outer wall of the limiting sleeve and an inner wall of the lower housing are respectively provided with recesses and protruding ridges matching with each other to limit the rotation of the limiting sleeve.

In some examples, the lid lock for a refueling or charging port further comprises: a trajectory sleeve connected to a tail portion of the lifting shaft, the trajectory sleeve being provided with a trajectory control slot on an outer wall thereof, wherein the limiting sleeve is provided with a positioning pin on an inner wall thereof; and wherein the positioning pin and the trajectory control slot are configured to cooperate with each other to control the trajectory of the ascending, descending and rotational movement of the lifting shaft.

In some examples, the trajectory control slot comprises a transverse slot and a longitudinal slot, the longitudinal slot extending in the axial direction of the lifting shaft, and the transverse slot extending around the lifting shaft, wherein a top end of the longitudinal slot is communicated with one end of the transverse slot.

In some examples, the lifting shaft is configured such that the lifting shaft performs a rotational movement when the positioning pin slides cooperatively in the transverse slot, and that the lifting shaft performs a linearly ascending or descending movement when the positioning pin slides cooperatively in the longitudinal slot.

In some examples, the trajectory sleeve is integrally formed with the lifting shaft, or the trajectory sleeve is fixedly connected to and sleeved on the tail portion of the lifting shaft.

In some examples, the tail portion of the lifting shaft has a friction portion, wherein the trajectory sleeve is formed integrally with the friction portion by an injection molding process.

In some examples, the worm shaft is arranged such that an axial direction thereof is perpendicular to the axial direction of the lifting shaft.

In some examples, the lid lock for a refueling or charging port further comprises: a lid mount seat connected to the head of the lifting shaft, the lid mount seat being used to mount the refueling or charging port lid that is located above the lid mount seat.

In some examples, the lid lock for a refueling or charging port further comprises: a driving shaft connected to the worm shaft to drive the worm shaft to rotate; and a nut sleeved on the driving shaft to limit the position of the worm shaft in the cavity.

Other objectives and advantages of the present disclosure will be apparent from the following description of the present disclosure with reference to the accompanying drawings, which can facilitate the comprehensive understanding of the present disclosure.

Figure 1B:
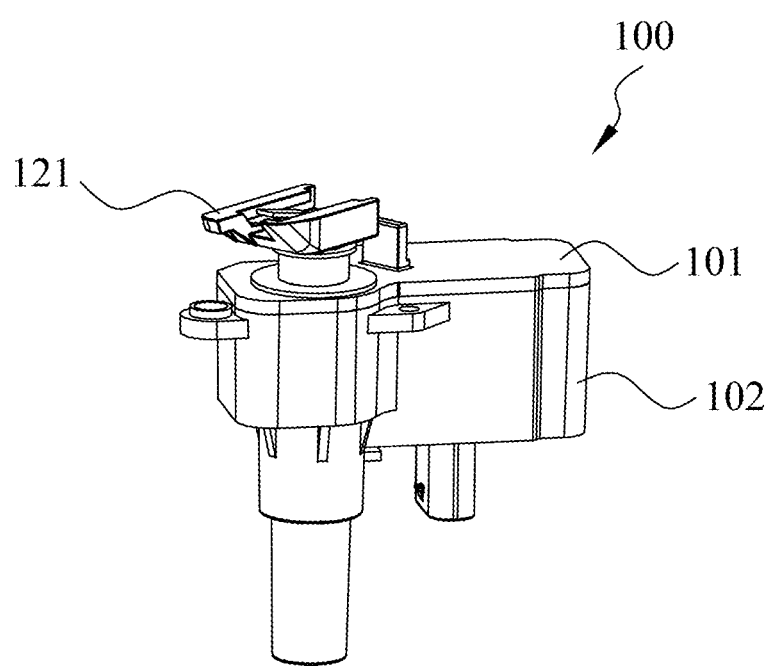
FIG. 1B is a perspective structural diagram of the lid lock for a refueling or charging port shown in FIG. 1A in an opened state.
Figure 1C:
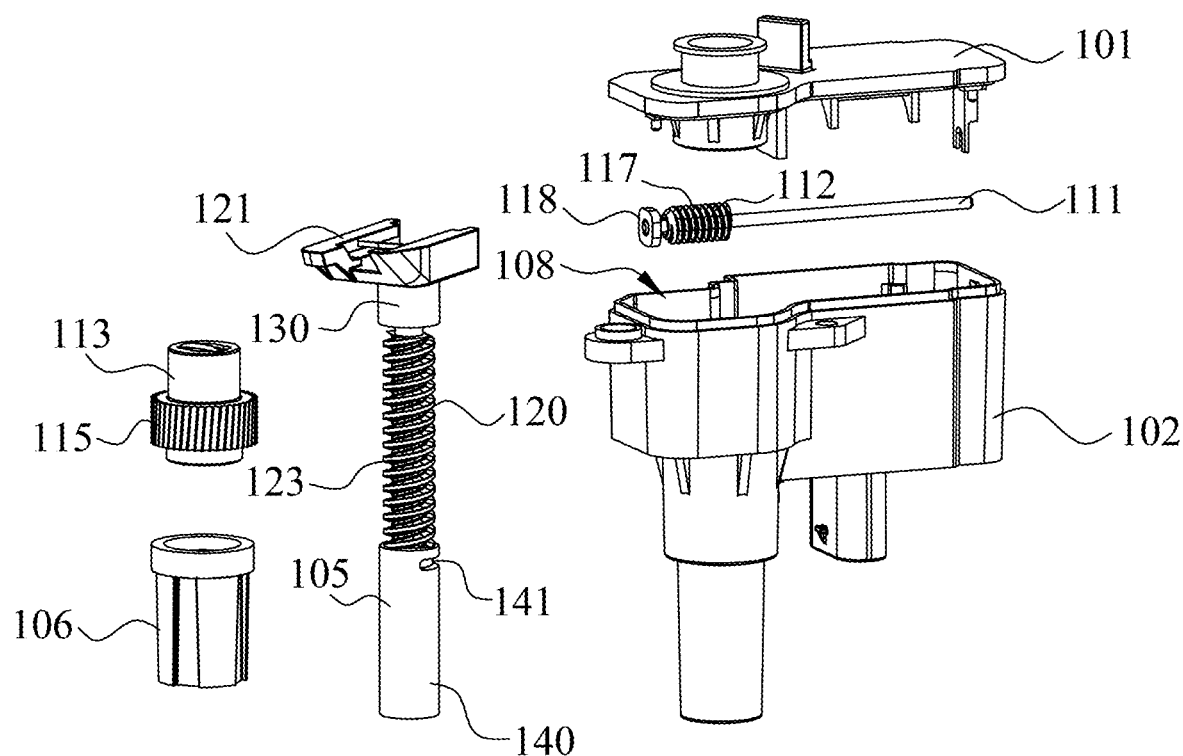
FIG. 1C is an exploded view of the lid lock for a refueling or charging port shown in FIG. 1A.
Figure 1D:
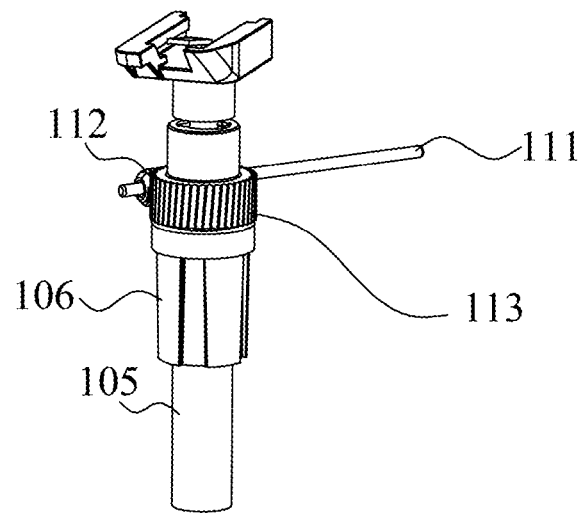
FIG. 1D is a perspective structural diagram of the lid lock for a refueling or charging port shown in FIG. 1A with a housing removed.

FIGS. 1A-1D show a general structure of a lid lock 100 for a refueling or charging port according to the present disclosure, wherein FIGS. 1A and 1B respectively show perspective structures of the lid lock 100 for a refueling or charging port in a closed state and an opened state;

FIG. 1C shows an exploded view of the lid lock 100 for a refueling or charging port; and FIG. 1D shows a mating structure of various components of the lid lock 100 for a refueling or charging port (hereinafter referred to as the lid lock 100) with a housing being omitted.

As shown in FIGS. 1A-1D, the lid lock 100 comprises a housing, which comprises an upper housing 101 and a lower housing 102. The lower housing 102 has a cavity 108 therein, and the upper housing 101 covers the lower housing 102 and closes the cavity 108. The lower housing 102 is used to be fixedly mounted to a vehicle, such as a vehicle body near a refueling or charging port of the vehicle. The upper housing 101 is connected to the lower housing 102 by welding.

The lid lock 100 further comprises a lifting shaft 120. The lifting shaft 120 has a head 130 and a tail portion 140. The head 130 of the lifting shaft 120 protrudes from of the cavity 108, and the portion of the lifting shaft 120 below the head 130 is accommodated in the cavity 108. Lifting screw teeth 123 are provided on an outer wall of the lifting shaft 120 between the head 130 and the tail portion 140, and the lifting screw teeth 123 are used to drive the lifting shaft 120 to move. The head 130 of the lifting shaft 120 is connected to a lid mount seat 121, and the lid mount seat 121 is provided with a connecting structure that matches with a refueling or charging port lid 960 (see the refueling or charging port lid 960 in FIGS. 9A and 10B) for connecting the refueling or charging port lid 960 above the lid mount seat 121. The refueling or charging port lid 960 is driven to move by the movement of the lifting shaft 120. In this embodiment, a sliding slot 164 is disposed on the lid mount seat 121, and a track 965 is disposed on a bottom portion of the refueling or charging port lid 960, which track matches with the sliding slot 164 to connect the refueling or charging port lid 960 to the lid mount seat 121. When the lid lock 100 is mounted to the vehicle, the upper housing 101 and the lower housing 102 are connected to the vehicle and are fixedly secured. The lifting shaft 120 can move relative to the upper housing 101 and the lower housing 102, thereby driving the refueling or charging port lid 960 to move relative to the refueling or charging port on the vehicle so as to cover or expose the refueling or charging port. For ease of description, the following ascending (or upward), descending (or downward) or rotational movements, etc. are all relative to the fixedly secured upper housing 101 and lower housing 102.

The lid lock 100 further comprises a worm wheel 113, which is arranged in the cavity 108. The worm wheel 113 is used to drive the lifting shaft 120 to move. The worm wheel 113 is internally provided with inner screw teeth 238 (see FIG. 2B) and externally provided with an outer gear 115. The inner screw teeth 238 are meshed with the lifting screw teeth 123 on the lifting shaft 120 to enable relative rotation between the worm wheel 113 and the lifting shaft 120. In this embodiment, the position of the worm wheel 113 in an axial direction of the lifting shaft 120 is stationary, such that the worm wheel 113, when meshed with the lifting shaft 120, performs only a rotational movement to drive the lifting shaft 120 to perform an ascending, descending or rotational movement. The specific structure of the worm wheel 113 will be described in detail below with reference to FIGS. 2A and 2B.

The lid lock 100 further comprises a driving shaft 111, a worm shaft 112, and a nut 118, all of which are also arranged in the cavity 108. The worm shaft 112 is used to drive the worm wheel 113 to move. The worm shaft 112 is connected to a front portion of the driving shaft 111, and a rear end of the driving shaft 111 is used to connect to a power source such as a motor, so that the worm shaft 112 can be driven to rotate by the driving shaft 111. The worm shaft 112 is provided with helical teeth 117 on the outside thereof, and the helical teeth 117 are meshed with the outer gear 115 of the worm wheel 113, so that the rotation of the worm shaft 112 drives the worm wheel 113 to rotate. In an embodiment of the present disclosure, an axial direction of the worm shaft 112 is provided substantially perpendicular to the axial direction of the lifting shaft 120. The driving shaft 111 drives the worm wheel 112 to rotate in a first direction or a second direction perpendicular to the first direction, thereby driving the worm wheel 113 to rotate clockwise or counterclockwise. The nut 118 is sleeved at a front end of the driving shaft 111 to limit the position of the driving shaft 111 in the lower housing 102, so as to limit the position of the worm shaft 112 in the cavity 108.

The lid lock 100 further comprises a trajectory sleeve 105 and a limiting sleeve 106, both of which are also arranged in the cavity 108. The trajectory sleeve 105 and the limiting sleeve 106 are mainly used to control a movement trajectory of the lifting shaft 120. Specifically, the trajectory sleeve 105 is fixedly connected to the outside of the tail portion 140 of the lifting shaft 120, and the trajectory sleeve 105 is provided with a trajectory control slot 141.

The limiting sleeve 106 is relatively fixedly connected in the cavity 108 in the lower housing 102, and is supported below the worm wheel 113. The limiting sleeve 106 and the upper housing 101 jointly limit the movement of the worm wheel 113 in the axial direction of the lifting shaft 120. The limiting sleeve 106 is provided with a positioning pin 331 on an inner wall thereof (see FIG. 3B). Since the limiting sleeve 106 is fixedly secured relative to the lower housing 102, the movement trajectory of the lifting shaft 120 can be controlled by cooperative sliding of the positioning pin 331 in the trajectory control slot 141.

Thus, after the power source (e.g., the motor) drives the driving shaft 111 to rotate, the worm shaft 112 on the driving shaft 111 drives the worm wheel 113 to rotate. The movement of the worm wheel 113 in the axial direction is jointly limited by the upper housing 101 and the limiting sleeve 106, so that the rotation of the worm wheel 113 can drive the lifting shaft 120 to move. The trajectory sleeve 105 cooperates with the limiting sleeve 106 to jointly control the trajectory of the lifting shaft 120 during the movement.

Figure 2A:
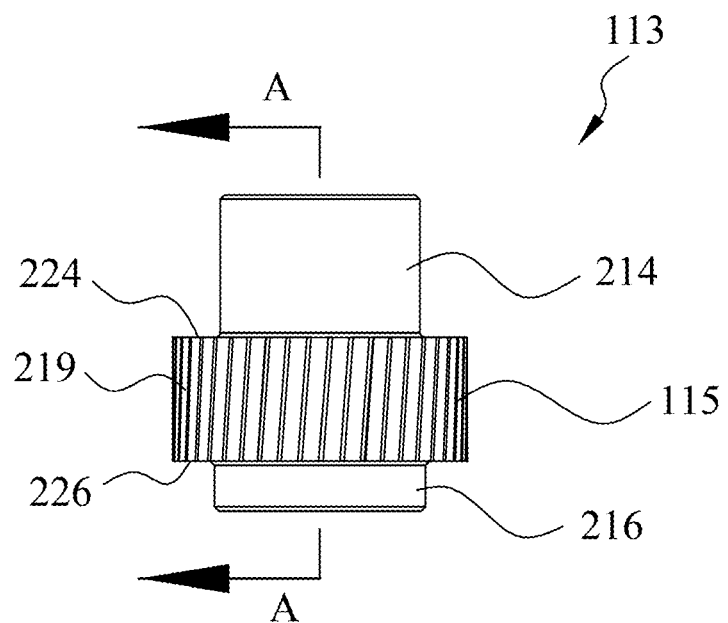
FIG. 2A is a front view of a worm wheel in FIG. 1C.
Figure 2B:
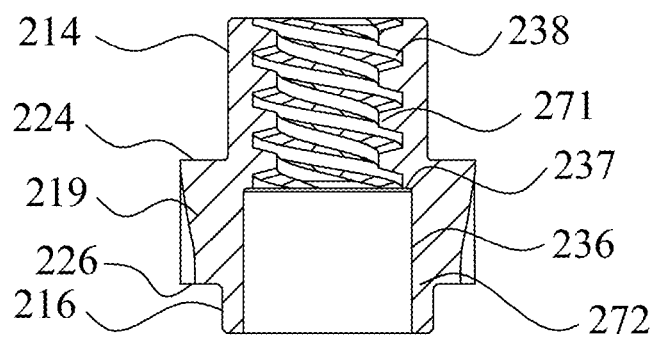
FIG. 2B is a cross-sectional view of the worm wheel shown in FIG. 2A, taken along line A-A.

FIGS. 2A and 2B show a specific structure of the worm wheel 113, wherein FIG. 2A shows a front view of the worm wheel 113, and FIG. 2B shows a cross-sectional view of FIG. 2A taken along line A-A. As shown in FIGS. 2A and 2B, the worm wheel 113 externally comprises a top sleeve 214, a bottom sleeve 216, and a middle sleeve 219 located between the top sleeve 214 and the bottom sleeve 216, and the outer gear 115 is arranged on an outer wall of the middle sleeve 219. The outer diameter of the middle sleeve 219 is greater than that of the top sleeve 214 and that of the bottom sleeve 216, so that a top surface of a joint between the middle sleeve 219 and the top sleeve 214 and a bottom surface of a joint between the middle sleeve 219 and the bottom sleeve 216 form two stepped portions 224, 226. When the worm wheel 113 is mounted in the cavity 108, the upper housing 101 presses against the stepped portion 224 (see FIG. 6B) to prevent the worm wheel 113 from moving upward. The bottom sleeve 216 is used to be inserted into a top opening 328 (see FIG. 3B) of the limiting sleeve 106, such that the stepped portion 226 can abut against the bottom sleeve 216, and thus the limiting sleeve 106 can prevent the worm wheel 113 from moving downward.

The worm wheel 113 is internally hollow. An inner wall 236 of an upper portion 271 of the worm wheel 113 is provided with inner screw teeth 238 that extend downward from the top sleeve 214, and the inner screw teeth 238 do not penetrate the entire worm wheel 113. A lower portion 272 of the worm wheel 113 is hollow. Moreover, the size of an inner wall 236 of the lower portion 272 is greater than a maximum size of the inner screw teeth 238 of the upper portion 271, so as to form a stepped surface 237 on a bottom of the inner screw teeth 238. The lower portion 272 of the worm wheel 113 is used to accommodate the trajectory sleeve 105.

Figure 3A:
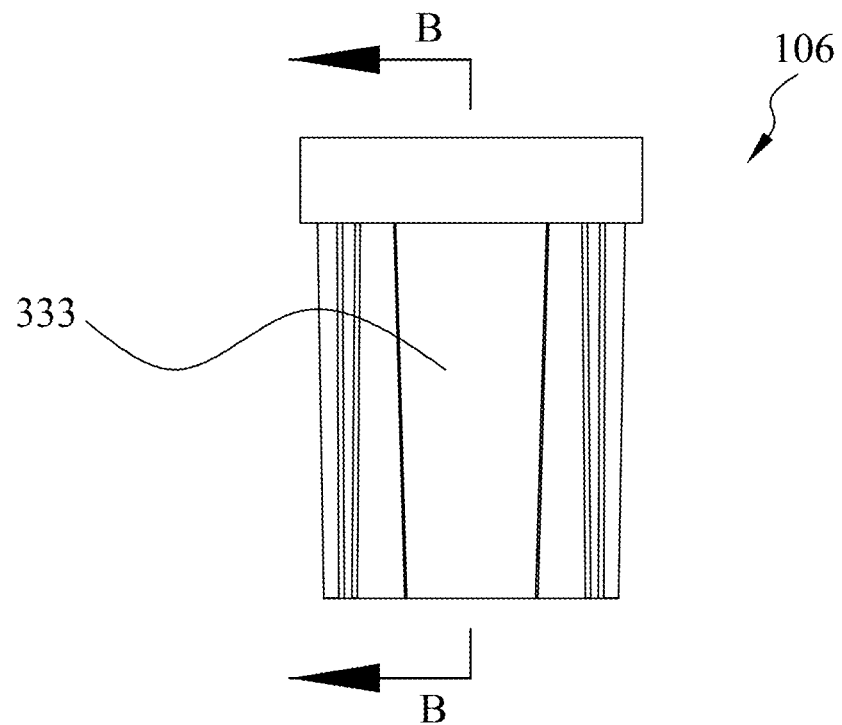
FIG. 3A is a front view of a limiting sleeve in FIG. 1C.
Figure 3B:
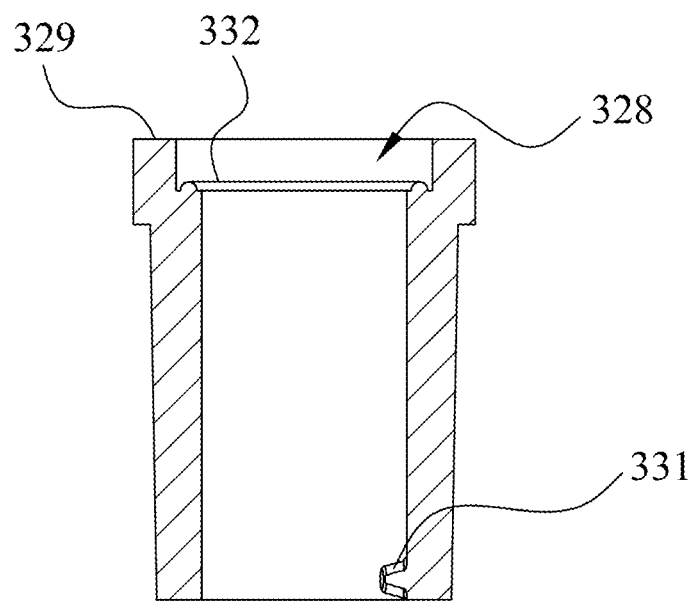
FIG. 3B is a cross-sectional view of the limiting sleeve shown in FIG. 3A, taken along line B-B.

FIGS. 3A and 3B show a specific structure of the limiting sleeve 106, wherein FIG. 3A shows a front view of the limiting sleeve 106, and FIG. 3B shows a cross-sectional view of FIG. 3A taken along line B-B. As shown in FIGS. 3A and 3B, the limiting sleeve 106 is in a hollow cylindrical shape, and is used to be sleeved outside the trajectory sleeve 105 and accommodate the trajectory sleeve 105 for a movement therein. A top portion of the limiting sleeve 106 protrudes radially outward to form a stepped portion 329 complementary to the stepped portion 226 of the worm wheel 113, and an annular supporting surface 332 is formed on the inner wall. That is to say, the inner diameter of the inner wall above the annular supporting surface 332 is greater than that of the inner wall below the annular supporting surface. Therefore, when the bottom sleeve 216 of the worm wheel 113 is inserted into the limiting sleeve 106 from the top opening 328, the annular supporting surface 332 can abut against a bottom surface of the worm wheel 113 from below while a top surface of the limiting sleeve 106 can abut against the stepped portion 226 of the worm wheel 113, so as to limit the downward movement of the worm wheel 113.

An inner wall of a bottom portion of the limiting sleeve 106 protrudes radially inward to form a positioning pin 331, and the positioning pin 331 is used to be inserted into the trajectory control slot 141 in an outer wall of the trajectory sleeve 105. It can be understood by those skilled in the art that the height of the positioning pin 331 matches the depth of the trajectory control slot 141.

An outer wall of the limiting sleeve 106 is provided with recesses 333 extending in the axial direction, and the recesses 333 are used to cooperate with protruding ridges 534 (see FIG. 5) on an inner wall of the lower housing 102, so as to connect the limiting sleeve 106 in the lower housing 102 and limit the rotation of the limiting sleeve 106 in the cavity 108. In an example, there are four recesses 333 that are symmetrically provided, and the recesses 333 are trapezoidal in shape, and have widths in the axial direction gradually increasing from top to bottom. Similarly, the protruding ridges 534 match the recesses in quantity and shape. For example, there are also four protruding ridges 534, which have widths gradually increasing from top to bottom, so as to facilitate a guided insertion of the limiting sleeve 106 into the lower housing 102 from above.

FIGS. 4A and 4B show perspective structures of the lifting shaft 120 and the trajectory sleeve 105 at two angles to illustrate a specific shape of the trajectory control slot 141. As shown in FIGS. 4A and 4B, the trajectory sleeve 105 is sleeved and fixed on the outside of the tail portion 140 of the lifting shaft 120. In this embodiment, the tail portion 140 of the lifting shaft 120 has a friction portion 645 (see FIG. 6B), wherein the trajectory sleeve 105 is formed integrally with the friction portion 645 by an injection molding process. The friction portion 645 comprises rough protrusions on an outer wall of the lifting shaft 120 to increase a friction force between the trajectory sleeve 105 and the outer wall of the lifting shaft 120, so as to increase an adhesive force during the injection molding process. In other embodiments, the trajectory sleeve 105 may also be sleeved outside the tail portion 140 of the lifting shaft 120 in other ways, ensuing that a fixed connection is provided between the trajectory sleeve 105 and the lifting shaft 120. The outer diameter of the trajectory sleeve 105 is greater than a maximum outer diameter of the lifting screw teeth 123, such that when the lifting screw teeth 123 are meshed with the inner screw teeth 238 of the worm wheel 113, a top portion of the trajectory sleeve 105 can abut against the stepped surface 237 of the worm wheel 113.

The trajectory control slot 141 comprises a transverse slot 442 and a longitudinal slot 443 communicated with each other. The longitudinal slot 443 extends in the axial direction of the lifting shaft 120, and the transverse slot 442 extends circumferentially around the lifting shaft 120. In this embodiment, the transverse slot 442 is connected to a top end of the longitudinal slot 443, and one end of the transverse slot 442 is communicated with the top end of the longitudinal slot 443. Thus, the positioning pin 331 can cooperatively slide in the transverse slot 442 and the longitudinal slot 443 of the trajectory control slot 141 continuously. The other end of the transverse slot 442 is a blind end to define an extreme position of the positioning pin 331. The other end of the longitudinal slot 443 extends to a bottom end of the trajectory sleeve 105, so as to facilitate the assembly of the trajectory sleeve 105 with the limiting sleeve 106.

When the positioning pin 331 of the limiting sleeve 106 cooperatively slides in the longitudinal slot 443, since the limiting sleeve 106 cannot rotate, the trajectory sleeve 105 and the lifting shaft 120 fixedly connected to the trajectory sleeve 105 are limited and also cannot perform a rotational movement, so that the worm wheel 113 moves relative to the lifting shaft 120, and the rotation of the worm wheel 113 drives only the lifting shaft 120 to move in an ascending or descending manner in the axial direction.

When the positioning pin 331 of the limiting sleeve 106 cooperatively slides in the transverse slot 442, although the limiting sleeve 106 cannot rotate, the trajectory sleeve 105 and the lifting shaft 120 fixedly connected to the trajectory sleeve 105 can perform a rotational movement relative to the limiting sleeve 106 in a circumferential direction of the lifting shaft 120, so that the rotation of the worm wheel 113 can drive the lifting shaft 120 to perform a rotational movement together.

FIG. 5 shows a perspective longitudinal cross-sectional view of the lower housing 102 to show an internal structure of the lower housing 102. As shown in FIG. 5, the lower housing 102 comprises a cylinder 551, a cylinder 552, and a case 553. The cylinder 552 is arranged above the cylinder 551, and the inner diameter of the cylinder 552 is greater than that of the cylinder 551. The cylinder 551 and the cylinder 552 are used to accommodate the lifting shaft 120, and the cylinder 552 is further used to accommodate the limiting sleeve 106. Protruding ridges 534 are arranged on an inner wall of the cylinder 552.

The case 553 is transversely arranged above the cylinder 552, and is used to accommodate the driving shaft 111 and the worm shaft 112. It can be understood by those skilled in the art that the lower housing 102 further comprises a motor housing 554, which is used to accommodate a motor (not shown) connected to the driving shaft 111. The worm wheel 113 is also accommodated in the case 553. The case 553 is internally provided with a groove 535 for housing the nut 118 and limiting the position of the nut 118, so as to prevent the worm shaft 112 from performing a movement in the cavity 108 except for rotation.

Figure 6A:
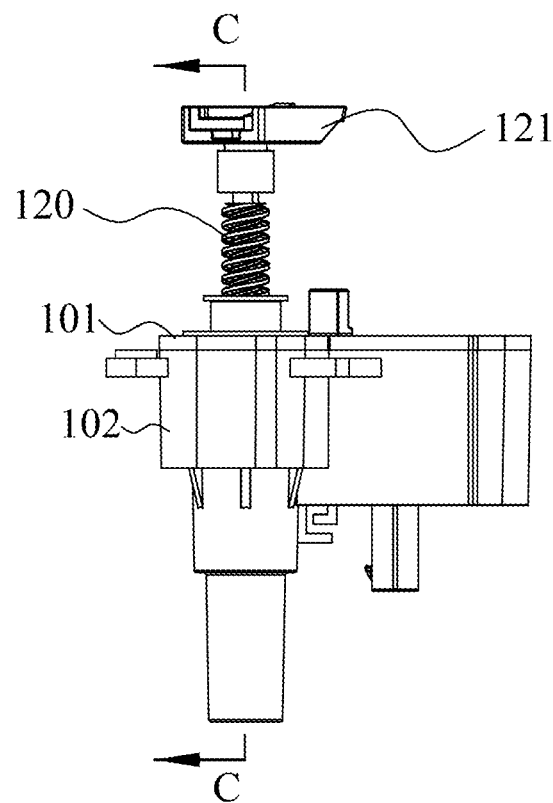
FIG. 6A is a front view of the lid lock of a refueling or charging port when the lid lock is in a closed state.
Figure 6B:
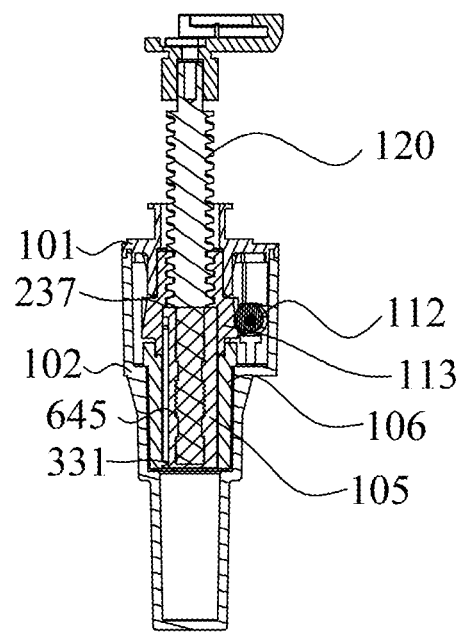
FIG. 6B is a cross-sectional view of the lid lock of a refueling or charging port shown in FIG. 6A, taken along line C-C.
Figure 6C:
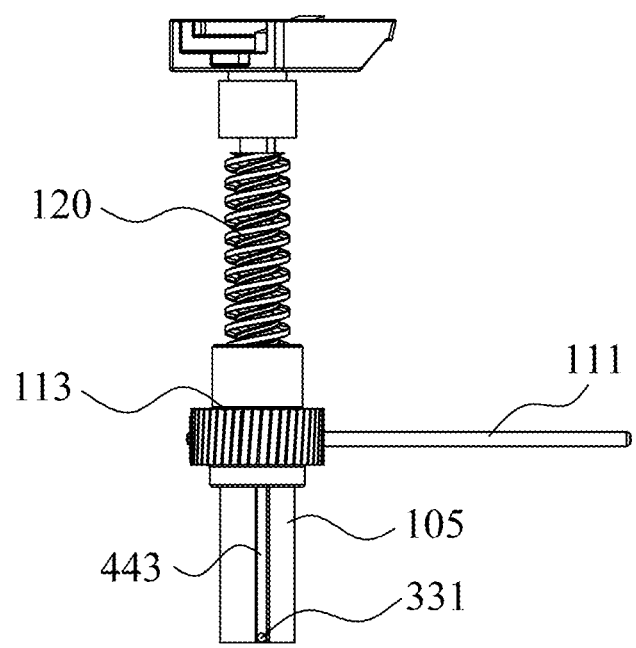
FIG. 6C is a perspective structural diagram of the lid lock of a refueling or charging port shown in FIG. 6A with a housing and a trajectory sleeve removed.

FIGS. 6A-6C show a specific structure of the lid lock 100 when the lid lock 100 is in a closed state. FIG. 6A shows a front view of the lid lock 100, FIG. 6B shows a cross-sectional view of the lid lock 100 taken along line C-C, and FIG. 6C shows a mating relationship between various components in the lid lock 100. In order to facilitate the observation of a mating relationship between the positioning pin 331 and the trajectory control slot 141, the limiting sleeve 106 is omitted in FIG. 6C, but the positioning pin 331 is shown.

As shown in FIGS. 6A-6C, when the lid lock 100 is in the closed state, the lifting shaft 120 ascends to a highest position relative to the upper housing 101 and the lower housing 102, so that the lid mount seat 121 is located at the topmost position of the lid lock 100. The worm wheel 113 is on a bottommost portion of the lifting shaft 120 relative to the lifting shaft 120, and the stepped surface 237 on the inner wall of the worm wheel 113 abuts against a top end of the trajectory sleeve 105, so that the lifting shaft 120 cannot continue to ascend relative to the worm wheel 113. At this position, the refueling or charging port lid 960 mounted on the lid mount seat 121 is flush with a vehicle door outer sheet metal 961 (see FIGS. 9A and 9B) to close the refueling or charging port. In this case, the positioning pin 331 is located at a bottom end of the longitudinal slot 443.

Figure 7A:
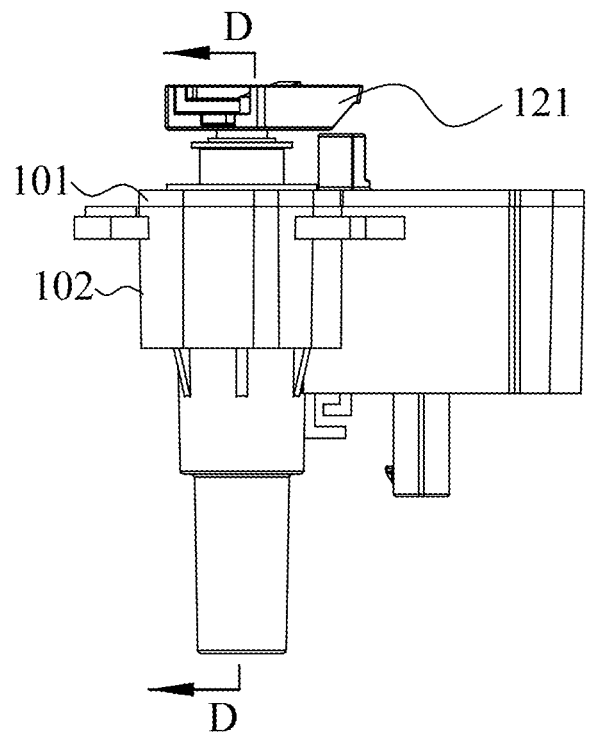
FIG. 7A is a front view of the lid lock of a refueling or charging port during the opening operation of the lid lock.
Figure 7B:
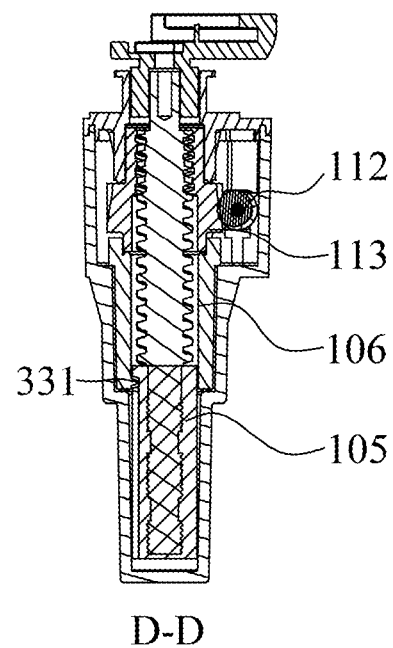
FIG. 7B is a cross-sectional view of the lid lock of a refueling or charging port shown in FIG. 7A, taken along line D-D.
Figure 7C:
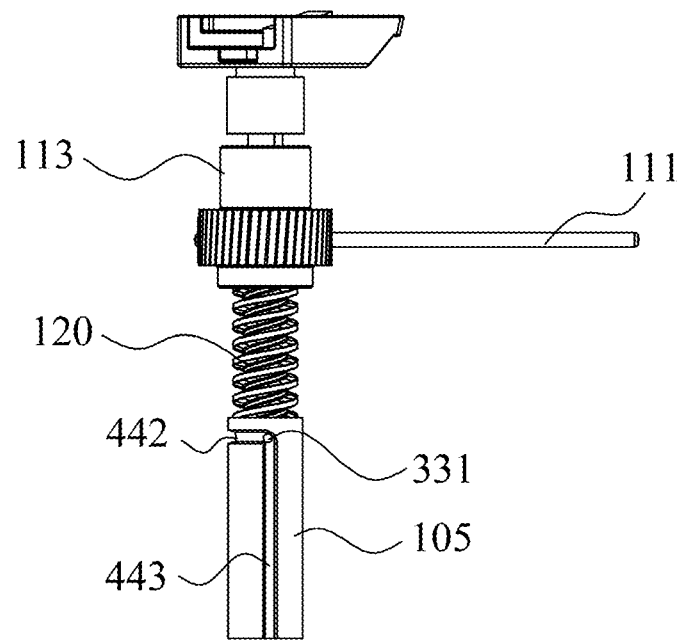
FIG. 7C is a perspective structural diagram of the lid lock of a refueling or charging port shown in FIG. 7A with a housing and a trajectory sleeve removed.

When the power source (such as the motor) is controlled to open the lid lock 100, the driving shaft 111 rotates the worm shaft 112 in the first direction, thereby driving the worm wheel 113 to rotate counterclockwise (i.e., to the right in FIG. 6C), and then the worm wheel 113 drives the lifting shaft 120, so that the lifting shaft 120 performs a descending movement in the axial direction of the lifting shaft 120. In this case, since the positioning pin 331 is arranged on the inner wall of the limiting sleeve 106, and the limiting sleeve 106 is fixedly secured relative to the lower housing 102, the positioning pin 331 cooperates with the longitudinal slot 443 to limit the rotational movement of the lifting shaft 120, so that the lifting shaft 120 performs only a linearly descending movement, but cannot perform a rotational movement until the positioning pin 331 reaches a topmost portion of the longitudinal slot 443 as shown in FIGS. 7A-7C. When the lid lock 100 reaches the state as shown in FIGS. 7A-7C, the refueling or charging port lid 960, to which the lid mount seat 121 of the lifting shaft 120 is connected, retracts downward (or into the vehicle).

FIGS. 7A-7C show a specific structure of the lid lock 100 during the opening operation of the lid lock 100. FIG. 7A shows a front view of the lid lock 100, FIG. 7B shows a cross-sectional view of the lid lock 100 taken along line D-D, and FIG. 7C shows a mating relationship between various components in the lid lock 100. In order to facilitate the observation of a mating relationship between the positioning pin 331 and the trajectory control slot 141, the limiting sleeve 106 is omitted in FIG. 7C, but the positioning pin 331 is shown.

As shown in FIGS. 7A-7C, during opening operation of the lid lock 100, the lifting shaft 120 descends to a lowest position relative to the upper housing 101 and the lower housing 102, so that the lid mount seat 121 is located on a bottommost portion of the lid lock 100. The worm wheel 113 is located on a topmost portion of the lifting shaft 120 relative to the lifting shaft 120. At this position, the refueling or charging port lid 960 mounted on the lid mount seat 121 is retracted below the vehicle door outer sheet metal 961, and is spaced apart from the vehicle door outer sheet metal 961 by a certain distance, but the refueling or charging port is not exposed. In this case, the positioning pin 331 is located at the top end of the longitudinal slot 443.

Figure 8C:
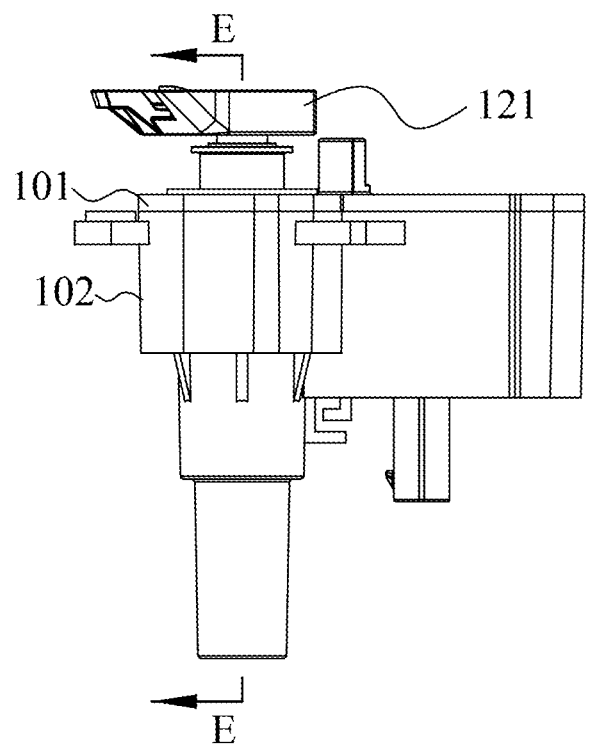
FIG. 8C is a perspective structural diagram of the lid lock of a refueling or charging port shown in FIG. 8A with a housing and a trajectory sleeve removed.
Figure 8C:
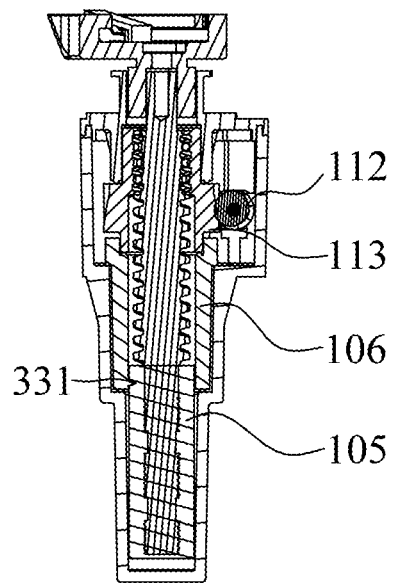
Figure 8C:
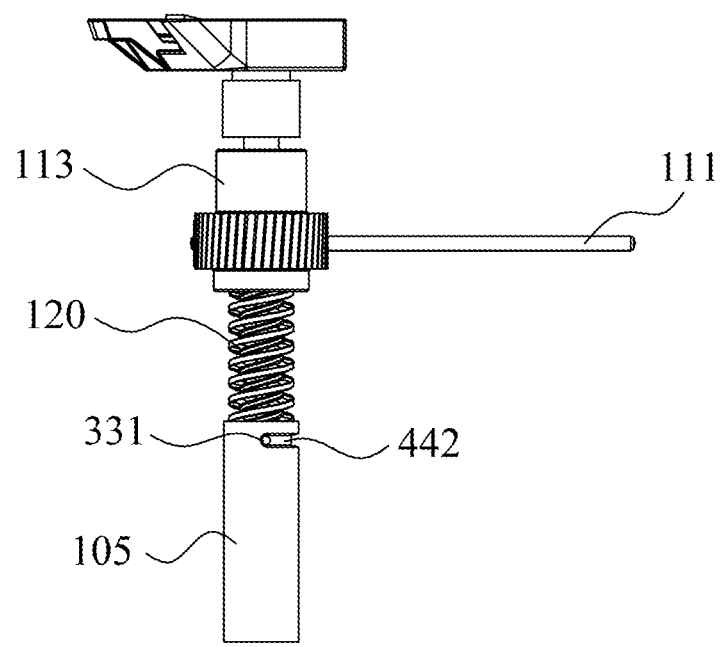

When the power source is controlled to continue to open the lid lock 100, the driving shaft 111 continues to rotate the worm shaft 112 in the first direction, thereby driving the worm wheel 113 to continue to rotate, and the worm wheel 113 drives the lifting shaft 120 to perform a rotational movement with the worm wheel 113. In this case, the positioning pin 331 enters the transverse slot 442 from the top end of the longitudinal slot 443 and then cooperatively slides along the transverse slot 442, so that the lifting shaft 120 performs only a rotational movement, but does not move in the axial direction, until the positioning pin 331 reaches a leftmost end of the transverse slot 442 as shown in FIGS. 8A-8C. When the lid lock 100 reaches the state as shown in FIGS. 8A-8C, the refueling or charging port lid 960, to which the lid mount seat 121 of the lifting shaft 120 is connected, is rotated to be opened to expose the refueling or charging port.

FIGS. 8A-8C show a specific structure of the lid lock 100 when the lid lock 100 is in an opened state. FIG. 8A shows a front view of the lid lock 100, FIG. 8B shows a cross-sectional view of the lid lock 100 taken along line E-E, and FIG. 8C shows a mating relationship between various components in the lid lock 100. In order to facilitate the observation of a mating relationship between the positioning pin 331 and the trajectory control slot 141, the limiting sleeve 106 is omitted in FIG. 8C, but the positioning pin 331 is shown.

As shown in FIGS. 8A-8C, after the lid lock 100 is opened, the lifting shaft 120 is kept at a lowest position relative to the upper housing 101 and the lower housing 102, so that the lid mount seat 121 is still located on the bottommost portion of the lid lock 100. The worm wheel 113 is located on a topmost portion of the lifting shaft 120 relative to the lifting shaft 120. At this position, the refueling or charging port lid 960 mounted on the lid mount seat 121 is retracted below the vehicle door outer sheet metal 961 (see FIGS. 10A and 10B), and is rotated to be opened to expose the refueling or charging port. In this case, the positioning pin 331 is located at a left end of the transverse slot 442, and the lifting shaft 120 cannot continue to move. The power source stops opening the lid lock 100, and the worm shaft 112 and the worm wheel 113 stop rotating.

During the closing operation of the lid lock 100, contrary to the process described above, the lid lock 100 first starts from the state as shown in FIGS. 8A-8C, and the worm shaft 112 rotates in the second direction to drive the worm wheel 113 to rotate clockwise (i.e., to the left in FIG. 8C), so as to drive the lifting shaft 120 to first perform a rotational movement to reach the state as shown in FIGS. 7A-7C and then perform a linearly ascending movement to reach the state as shown in FIGS. 6A-6C, and then the lid lock is completely closed.

Figure 9A:
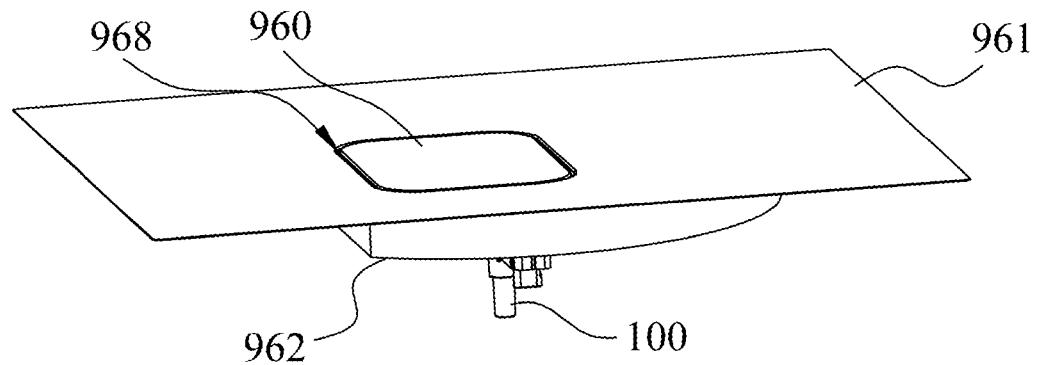
FIG. 9A is a schematic diagram of an assembly structure of the lid lock for a refueling or charging port shown in FIG. 1A when the lid lock for a refueling or charging port is in the closed state.
Figure 9B:
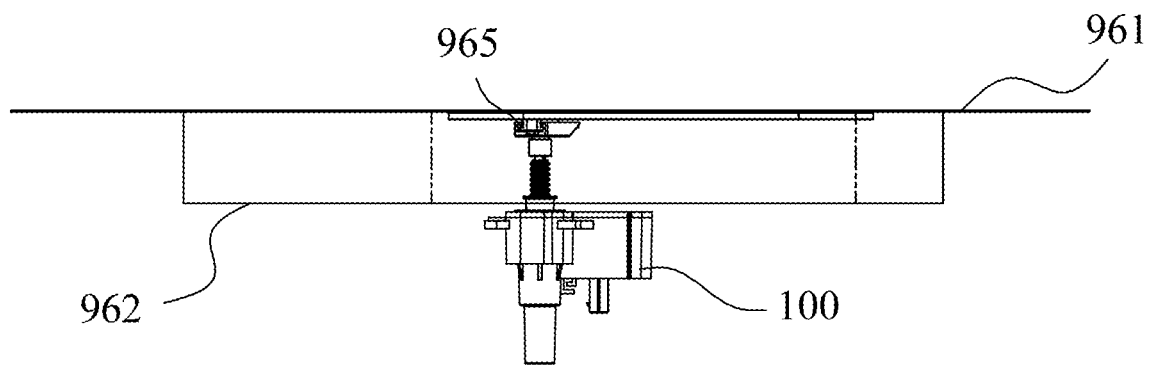
FIG. 9B is a front view of FIG. 9A.

FIGS. 9A and 9B show schematic diagrams of an assembly structure of the lid lock 100 for a refueling or charging port when the lid lock 100 for a refueling or charging port is in a closed state, to illustrate the assembly structure of the lid lock 100 for a refueling or charging port on a vehicle. As shown in FIGS. 9A and 9B, a vehicle door outer sheet metal 961 and a refueling or charging port mount seat 962 are spaced apart by a certain distance. The outer sheet metal 961 has a sheet metal opening 968, and a refueling or charging port (not shown in the figure) is arranged on the refueling or charging port mount seat 962 and is located below the sheet metal opening 968. When the lid lock 100 for a refueling or charging port is in a closed state, the refueling or charging port lid 960, which is connected above the lid mount seat 121, closes the sheet metal opening 968 and is flush with the outer sheet metal 961.

Figure 10A:
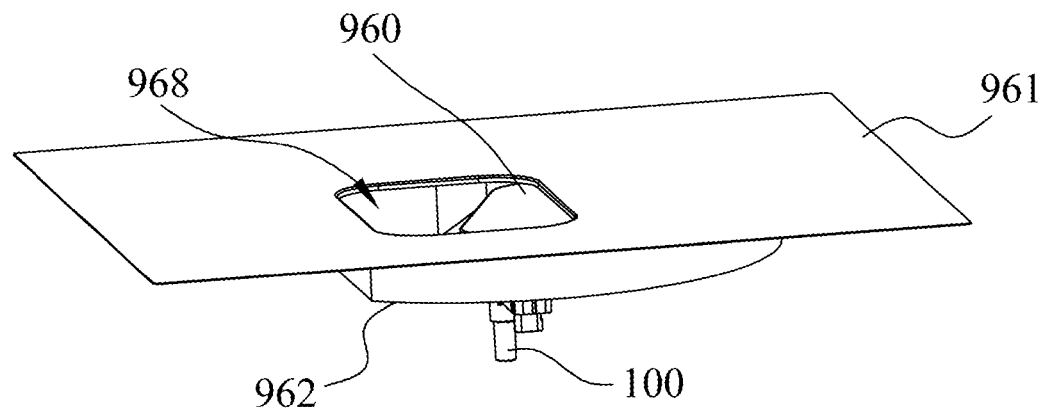
FIG. 10A is a schematic diagram of an assembly structure of the lid lock for a refueling or charging port shown in FIG. 1A when the lid lock for a refueling or charging port is in the opened state.
Figure 10B:
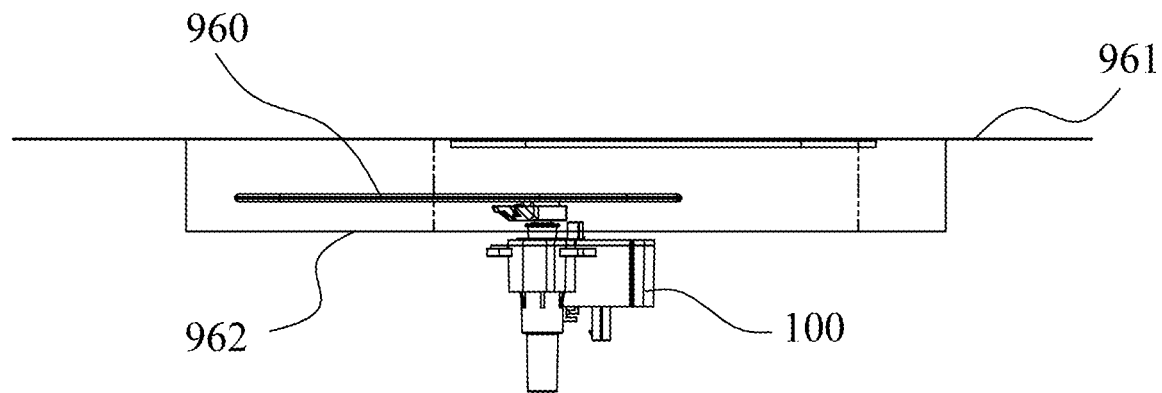
FIG. 10B is a front view of FIG. 10A.

FIGS. 10A and 10B show schematic diagrams of an assembly structure of the lid lock 100 for a refueling or charging port when the lid lock 100 for a refueling or charging port is in an opened state, to illustrate the assembly structure of the lid lock 100 for a refueling or charging port on a vehicle. As shown in FIGS. 10A and 10B, when the lid lock 100 for a refueling or charging port is in the opened state, the lid lock 100 for a refueling or charging port drives the refueling or charging port lid 960 to first descend below the outer sheet metal 961, and then the refueling or charging port lid 960 is rotated to open the sheet metal opening 968 in the outer sheet metal 961 and expose the refueling or charging port below the sheet metal opening 968.

In some embodiments, the lid lock 100 according to the present disclosure may further comprise a sensor (not shown), which may be connected to the power source to sense whether the lid is positionally in a closed or open state and generate a state signal of the lid lock 100. According to an example of the present disclosure, the sensor calculates whether the lid is positionally in a closed or open state by recording the number of rotation turns of the driving shaft 111. The lid lock 100 according to the present disclosure may further comprise a connector for electrically connecting the power source to a central control system of the vehicle, and the central control system may send a control signal for closing or opening the lid lock 100 to the power source or receive a signal transmitted by the power source (such as a state signal of the lid lock 100).

In some lid locks for a refueling or charging port of a vehicle, the refueling or charging port is opened and exposed by driving the refueling or charging port lid to protrude out of the outer sheet metal of the vehicle. This manner of opening the lid toward the outside of the vehicle may occupy an external space of the vehicle, and lid opening conditions are restricted by an external environment of the vehicle. The lid cannot be opened smoothly without sufficient external space of the vehicle or the like. In addition, parts of the lid may be damaged by a user, as the lid protrudes out of the outer sheet metal of the vehicle.

The present disclosure provides an internally retractable lid lock for a refueling or charging port. According to the present disclosure, the lid lock drives the refueling or charging port lid to retract toward the inside of the outer sheet metal of the vehicle to open and expose the refueling or charging port. During the opening operation of the lid lock according to the present disclosure, by designing the shape of the trajectory control slot, the lid is driven to first perform a linearly descending movement in the axial direction, to make room for the movement of the lid, and then the lid is rotated to expose the refueling or charging port. Therefore, an internal space between the outer sheet metal of the vehicle and the refueling and charging port is fully utilized, so that the lid can be opened in the internal space, which not only is not restricted by an external environment, but also reduces the possibility of damaging parts.

In addition, the upper housing and the lower housing of the lid lock for a refueling or charging port according to the present disclosure are fixedly connected together, and various components of the lid lock are substantially encapsulated between the upper housing and the lower housing, so that dust and rain can be prevented from affecting performances of the lid lock.

In addition, since the lid lock for a refueling or charging port according to the present disclosure is opened or closed by the axial movement and the rotational movement of the lifting shaft, the movement process is simple, and jamming or abnormal sound is not easy to occur. Moreover, the lifting shaft can provide a supporting force for the lid, so that the lid and the vehicle door outer sheet metal can be hermetically connected to each other better.

Although the present disclosure is described in conjunction with the examples of embodiments outlined above, various alternatives, modifications, variations, improvements, and/or substantial equivalents that are known or current or to be anticipated before long may be obvious to those of at least ordinary skill in the art. Furthermore, the technical effects and/or technical problems described in this description are exemplary rather than limiting. The disclosure in this description may be used to solve other technical problems and may have other technical effects. Accordingly, the examples of the embodiments of the present disclosure as set forth above are intended to be illustrative rather than limiting. Various changes may be made without departing from the spirit or scope of the present disclosure. Therefore, the present disclosure is intended to embrace all known or earlier disclosed alternatives, modifications, variations, improvements, and/or substantial equivalents.

What is claimed is:

1. A lid lock for a refueling or charging port, comprising:
a lifting shaft having a head for mounting a refueling or charging port lid, the lifting shaft being provided with lifting screw teeth on an outer wall thereof;
a worm wheel, the worm wheel being provided with inner screw teeth and an outer gear, the worm wheel being rotatably sleeved on the outside of the lifting shaft, the inner screw teeth of the worm wheel being meshed with the lifting screw teeth of the lifting shaft;
a limiting sleeve, wherein a top portion of an inner wall of the limiting sleeve and a bottom portion of the worm wheel have complementary stepped portions, such that the limiting sleeve is configured to support the worm wheel and to limit a downward movement of the worm wheel;
a worm shaft, the worm shaft being provided with helical teeth on the outside thereof, the helical teeth being meshed with the outer gear of the worm wheel, the worm shaft being rotatable in a first direction and a second direction opposite to the first direction; and
a housing having a cavity, wherein a portion of the lifting shaft is accommodated in the cavity, and the head of the lifting shaft protrudes from the cavity, and wherein the worm wheel and the worm shaft are accommodated in the cavity;
wherein the housing is fixedly secured so that when the lifting shaft moves, the lifting shaft moves relative to the housing;
wherein the limiting sleeve being arranged within the cavity of the housing and connected to the housing;
wherein the housing and the limiting sleeve are configured to limit the movement of the worm wheel in the axial direction, wherein the housing comprises an upper housing, and wherein a top portion of the worm wheel is positioned below the upper housing, such that the upper housing is capable of limiting an upward movement of the worm wheel; and
wherein the worm wheel and the worm shaft are configured such that the worm shaft rotates in the first direction to drive the worm wheel to rotate, thereby driving the lifting shaft to perform a descending movement along an axial direction of the lifting shaft and then perform a rotational movement to expose the refueling or charging port for fuel or electricity supply; or
the worm shaft rotates in the second direction to drive the worm wheel to rotate, thereby driving the lifting shaft to perform a rotational movement and then perform an ascending movement along the axial direction of the lifting shaft to close the refueling or charging port.

2. The lid lock for a refueling or charging port according to claim 1, wherein:
the housing further comprises a lower housing; and
wherein the limiting sleeve is arranged within the cavity of the lower housing, and wherein an outer wall of the limiting sleeve and an inner wall of the lower housing are respectively provided with recesses and protruding ridges matching with each other to limit the rotation of the limiting sleeve.

3. The lid lock for a refueling or charging port according to claim 1, further comprising:
a driving shaft, the driving shaft being connected to the worm shaft to drive the worm shaft to rotate; and
a nut, the nut being sleeved on the driving shaft to limit a position of the worm shaft in the cavity.

4. The lid lock for a refueling or charging port according to claim 1, wherein:
the worm shaft is arranged such that an axial direction thereof is perpendicular to the axial direction of the lifting shaft.

5. The lid lock for a refueling or charging port according to claim 1, further comprising:
a lid mount seat connected to the head of the lifting shaft, wherein the lid mount seat is configured to mount the refueling or charging port lid that is located above the lid mount seat.

6. A lid lock for a refueling or charging port, comprising:
a lifting shaft having a head for mounting a refueling or charging port lid, the lifting shaft being provided with lifting screw teeth on an outer wall thereof;
a worm wheel, the worm wheel being provided with inner screw teeth and an outer gear, the worm wheel being rotatably sleeved on the outside of the lifting shaft, the inner screw teeth of the worm wheel being meshed with the lifting screw teeth of the lifting shaft;
a limiting sleeve configured to limit the movement of the worm wheel in an axial direction
a worm shaft, the worm shaft being provided with helical teeth on the outside thereof, the helical teeth being meshed with the outer gear of the worm wheel, the worm shaft being rotatable in a first direction and a second direction opposite to the first direction; and
a trajectory sleeve connected to a tail portion of the lifting shaft, the trajectory sleeve being provided with a trajectory control slot on an outer wall thereof;
wherein the worm wheel and the worm shaft are configured such that the worm shaft rotates in the first direction to drive the worm wheel to rotate, thereby driving the lifting shaft to perform a descending movement along an axial direction of the lifting shaft and then perform a rotational movement to expose the refueling or charging port for fuel or electricity supply; or the worm shaft rotates in the second direction to drive the worm wheel to rotate, thereby driving the lifting shaft to perform a rotational movement and then perform an ascending movement along the axial direction of the lifting shaft to close the refueling or charging port;
wherein the limiting sleeve is provided with a positioning pin on an inner wall thereof; and
wherein the positioning pin and the trajectory control slot are configured to cooperate with each other to control the trajectory of the ascending, descending and rotational movements of the lifting shaft.

7. The lid lock for a refueling or charging port according to claim 6, wherein:
the trajectory control slot comprises a transverse slot and a longitudinal slot, the longitudinal slot extending along the axial direction of the lifting shaft, and the transverse slot extending around the lifting shaft, wherein a top end of the longitudinal slot is communicated with one end of the transverse slot.

8. The lid lock for a refueling or charging port as claimed in claim 7, wherein:
the lifting shaft is configured such that the lifting shaft performs a rotational movement when the positioning pin slides cooperatively in the transverse slot; and
the lifting shaft performs a linearly ascending or descending movement when the positioning pin slides cooperatively in the longitudinal slot.

9. The lid lock for a refueling or charging port according to claim 6, wherein:
the trajectory sleeve is integrally formed with the lifting shaft, or the trajectory sleeve is fixedly connected to and sleeved on the tail portion of the lifting shaft.

10. The lid lock for a refueling or charging port according to claim 9, wherein:
the tail portion of the lifting shaft has a friction portion, and wherein the trajectory sleeve is formed integrally with the friction portion by an injection molding process.

11. A lid lock for a port, the lid lock comprising:
a lifting shaft having a head configured for mounting a port lid, the lifting shaft including lifting screw threads formed on an outer surface thereof;
a worm wheel comprising internal threads and an external gear, the worm wheel being rotatably sleeved over the lifting shaft such that the internal threads of the worm wheel engage with the lifting screw threads of the lifting shaft;
a limiting sleeve having an inner wall having a top portion, wherein the top portion of the inner wall of the limiting sleeve and a bottom portion of the worm wheel have complementary stepped portions, the limiting sleeve being configured to support the worm wheel and restrict its downward movement; and
a worm shaft having helical teeth on an outer surface, the helical teeth being meshed with the external gear of the worm wheel, the worm shaft being rotatable in a first direction and a second, opposite direction.

12. The lid lock for a port of claim 11, wherein rotation of the worm shaft in the first direction causes the worm wheel to rotate, thereby driving the lifting shaft to move downward along its axial direction and then rotate to thereby open the port.

13. The lid lock for a port of claim 11, wherein rotation of the worm shaft in the second direction causes the worm wheel to rotate, thereby driving the lifting shaft to rotate and then move upward along its axial direction to close the port.

14. The lid lock for a port of claim 11, further comprising:
a housing defining a cavity, wherein at least a portion of the lifting shaft is disposed within the cavity, with the head of the lifting shaft protruding outward from the cavity;
wherein the worm wheel and the worm shaft are housed within the cavity; and
wherein the housing is fixed in place such that movement of the lifting shaft occurs relative to the housing.

15. The lid lock for a port of claim 14, wherein the limiting sleeve is positioned within the cavity of the housing and secured thereto, and wherein the housing and the limiting sleeve are cooperatively configured to limit axial movement of the worm wheel.

16. The lid lock for a port of claim 15, wherein the housing comprises an upper housing portion, and wherein an upper portion of the worm wheel is positioned beneath the upper housing portion, such that the upper housing portion restricts upward movement of the worm wheel.

17. The lid lock for a port of claim 16, wherein the housing further comprises a lower housing portion;
wherein the limiting sleeve is disposed within a cavity of the lower housing portion; and
wherein the outer surface of the limiting sleeve and an inner surface of the lower housing portion include corresponding recesses and protrusions that interlock to prevent rotation of the limiting sleeve.

\* \* \* \* \*